Patented May 19, 1953

2,639,283

UNITED STATES PATENT OFFICE 2,639,283

DIAMINOPHENYLTHIOBUTENES

Louis R. Freimiller, South Bend, Ind., and Charles H. McKeever, Glenside, Pa., assignors to Rohm & Haas Company, Philadelphia, Pa., a corporation of Delaware No Drawing. Application May 13, 1952, Serial No. 287,592

5 Claims. (Cl. 260—247.1)

This invention deals with 1,4-bis(amino)-2-phenylthio-2-butenes and with a method for their preparation. These compounds have the structure

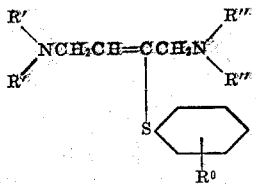

wherein R' and R'' individually represent lower alkyl groups of one to four carbon atoms or taken in pairs represent divalent groups which form a heterocycle with the nitrogen and R⁰ is hydrogen or an alkyl group, preferably such group of not over nine carbon atoms. They are useful as corrosion inhibitors, particularly in strongly acidic solutions such as are used for cleaning and for pickling metals. Some of these compounds show promise as hypotensive agents in the pharmaceutical field.

These compounds are prepared by reacting a thiophenol and a 1,4-bis(amino)-2-butyne in the presence of a catalyst, particularly zinc oxide, cadmium oxide, or a mixture thereof. The mixture is particularly effective, shortening induction period and favoring reaction at somewhat lower temperatures than with a single oxide. Catalytic effects are exhibited also by potassium hydroxide.

The reaction of acetylene, formaldehyde, and secondary amines, particularly in the presence of a copper catalyst, is known to lead to such compounds as 1,4-bis(dimethylamino)-2-butyne, 1,4-bis(diethylamino)-2-butyne, 1,4-bis(dibutylamino)-2-butyne, 1,4 - bis(morpholino) - 2 - butyne, 1,4-bis(thiamorpholino)-2-butyne, 1,4-bis(piperidino)-2-butyne and 1,4-bis(pyrrolidino)-2-butyne. These bis(amino)butynes are now found to be valuable intermediates for reaction with thiophenols.

The thiophenols of chief interest are thiophenol itself and alkyl-substituted thiophenols, including the various thiocresols, thio-p-tert.-butylphenol, thio-o-butylphenol, thio-p-diisobutylphenol, thiononylphenol, and the like. Other thiophenols having other inert ring substituents can also be used in this reaction. These phenols may be represented by the formula

wherein R⁰ is hydrogen or an alkyl group, preferably such group of not over nine carbon atoms.

In this structural formula the hexagon is used, as is conventional, to represent the phenyl nucleus.

The reaction is effected by bringing together a bis(amino)butyne and a thiophenol in approximately molar proportions and heating them in admixture with a catalyst. Temperatures between about 75° and 200° C. may be used for the reaction. Products may usually be separated by distillation at low pressures or collected as residues after removal of catalyst and stripping off of more volatile substances. Charcoaling and extracting may be used to improve the quality of the residue.

Preparation of compounds of this invention is shown with more detail in the following illustrative examples. Parts are by weight.

Example 1

There were placed in a reaction vessel equipped with stirrer, thermometer, and condenser 2 parts of cadmium oxide, 2 parts of zinc oxide, and 35 parts of 1,4-bis(dimethylamino)-2-butyne. This mixture was stirred and thereto was added thiophenol in an amount of 28 parts with evolution of some heat. The mixture was heated. At 94° C. the reaction mixture began to develop color and, as the reaction was advanced, passed through a series of colors from pink to red to dark red to brown. At 125° C. there was an exothermic reaction. Heating was continued with the temperature being carried to 190° C. The reaction mixture was then cooled to about 30° C. The contents of the reaction vessel were distilled at reduced pressure. After a small forerun there was obtained at 127°–140° C./0.8 mm. a fraction of 48 parts which corresponded in composition to 1,4-bis(dimethylamino)-2 - phenylthio - 2 - butene. This product contained 12.74% of carbon and 10.9% of nitrogen (theory 12.75% and 11.2% respectively).

Substitution of 31.5 parts of thiocresol for thiophenol in the above procedure yields 51 parts of 1,4-bis(dimethylamino)-2-methylphenylthio - 2-butene as a fraction distilling at 140°–155° C./0.8 mm.

Example 2

There were mixed 3 parts of zinc oxide, 2 parts of cadmium oxide, 77 parts of 1,4-bis(dibutylamino)-2-butyne, and 28 parts of thiophenol. The mixture was stirred and heated at gradually increasing temperatures to a maximum of 200° C. The reaction mixture was taken up in benzene and filtered. The filtrate was stripped by being heated to 140° C./1 mm. The residue was substantially 1,4-bis(dibutylamino)-2-phenylthio-2-butene.

Example 3

There were mixed 35 parts of 1,4-bis(dimethylamino)-2-butyne, 28 parts of thiophenol, and 3 parts of cadmium oxide. The mixture was stirred and heated to 125°–130° C. After about an hour reaction was noted. Heating was continued for three hours with the temperature of the reaction mixture being then slowly carried to 200° C. The reaction mixture was cooled, filtered, and distilled. The fraction taken at 130°–140° C./0.7–.8 mm. was 1,4-bis(dimethylamino)-2-phenylthio-2-butene.

Example 4

There were mixed and reacted as in the previous example 35' parts of 1,4-bis(dimethylamino)-2-butyne and 56 parts of thio-p-diisobutylphenol in the presence of 4 parts of cadmium oxide and 2 parts of zinc oxide. The reaction mixture was taken up in solvent, filtered, and stripped under low pressure. The product was obtained as a dark colored residue which corresponded in composition to

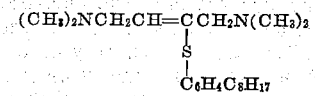

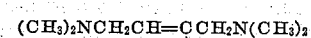

or

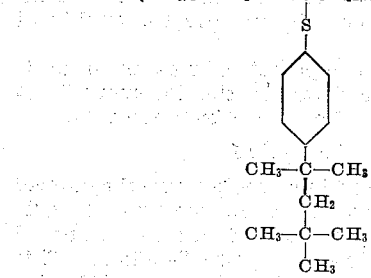

Example 5

A mixture of 112 parts of 1,4-dimorpholinyl-2-butyne and 11 parts of a mixture of equal weights of zinc oxide and cadmium oxide was stirred and heated to 150° C. Thereto there was added over a period of 30 minutes 55 parts of thiophenol. The temperature of the reaction mixture was then raised to 170° C., heating being continued for 45 minutes. The mixture was cooled and stirred with 800 parts of benzene. The benzene-containing mixture was filtered. The filtrate was distilled. At 161°–165° C./0.3 mm. there was obtained a fraction of 51 parts which was 1,4-dimorpholinyl-2-phenylthio-2-butene. Upon redistillation a fraction of 18 parts was taken at 183–184° C./0.3 mm. This had a refractive index, $n_D^{25}$, of 1.5671. It contained by analysis 64.58% of carbon and 7.74% of hydrogen, theoretical values for this compound being 64.63% and 7.84%, respectively.

This compound was treated with hydrochloric acid to yield the dihydrochloride. This salt melted at 237°–239° C. It contained by analysis 53.33% of carbon, 7.10% of hydrogen, and 6.98% of nitrogen. Comparable theoretical values are 53.06%, 6.93%, and 6.88%, respectively.

In the same way other indicated substituents may be used as R' and R'' and other thiophenols may be used. The products may be used as basic amines or converted to salts of organic or inorganic acids, as shown above.

This application is a continuation-in-part of our application Serial No. 237,824, filed July 20, 1951.

We claim:

1. As new chemical substances, compounds of the formula

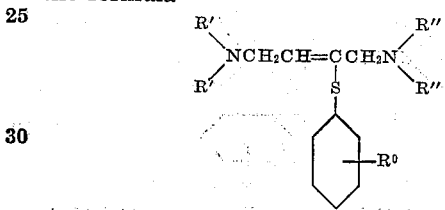

wherein $R^0$ represents a member of the class consisting of hydrogen and alkyl groups of not over nine carbon atoms, the R' substituents when taken as individual groups represent alkyl groups of not over four carbon atoms, and when taken together represent a divalent chain from the group consisting of —CH₂CH₂OCH₂CH₂—, —CH₂CH₂SCH₂CH₂—, —CH₂CH₂CH₂CH₂—, and —CH₂CH₂CH₂CH₂CH₂—, which jointly with the nitrogen atom form a heterocycle, and the R'' substituents represent the same groups as R'.

2. As a new chemical compound, 1,4-bis(dimethylamino)-2-phenylthio-2-butene.

3. As a new chemical compound, 1,4-bis(dimethylamino)-2-methylphenylthio-2-butene.

4. As a new chemical compound, 1,4-bis(dibutylamino)-2-phenylthio-2-butene.

5. As a new chemical compound, 1,4-bis(morpholinyl)-2-phenylthio-2-butene.

LOUIS R. FREIMILLER.
CHARLES H. McKEEVER.

No references cited.